O. A. RUSSELL.
TRACE FASTENER.
APPLICATION FILED JUNE 3, 1915.
1,224,023.
Patented Apr. 24, 1917.
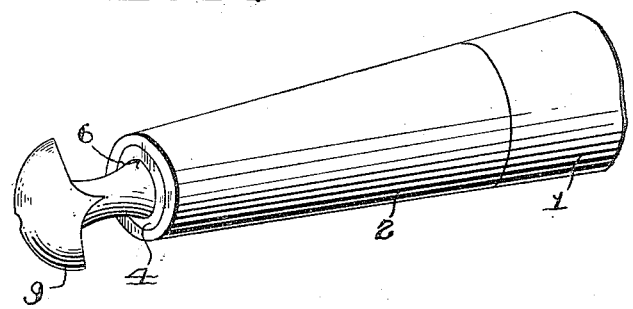
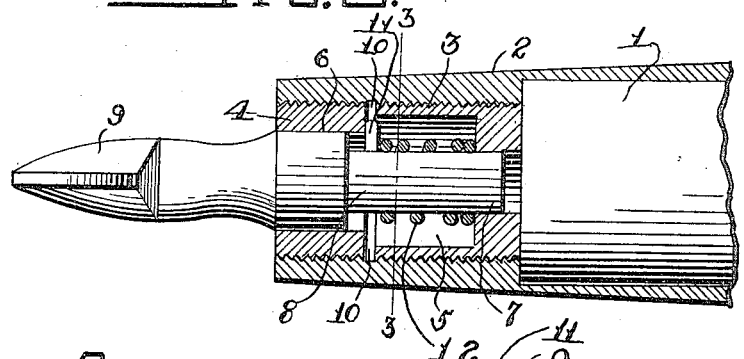
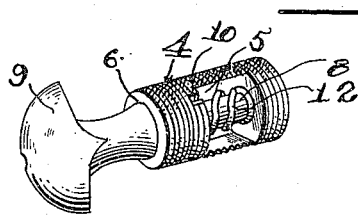
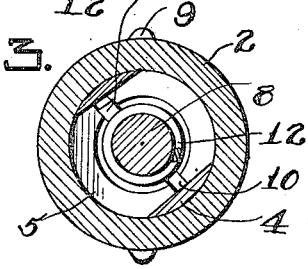
Inventor
O. A. Russell

UNITED STATES PATENT OFFICE.

OLIVER A. RUSSELL, OF WINDSOR, VERMONT.

TRACE-FASTENER.

1,224,023.

Specification of Letters Patent.  Patented Apr. 24, 1917.

Application filed June 3, 1915. Serial No. 31,949.

*To all whom it may concern:*

Be it known that I, OLIVER A. RUSSELL, a citizen of the United States, residing at Windsor, in the county of Windsor, State of Vermont, have invented certain new and useful Improvements in Trace-Fasteners; and I do hereby declare the following to be a full, clear, and exact description of the invention, such as will enable others skilled in the art to which it appertains to make and use the same.

The present invention is directed to improvements in trace fasteners, and has for its object to so construct a device of this character that the trace can be easily and quickly attached to or removed from the whiffletree.

A further object of the invention is to provide a trace fastener which is extremely simple in construction, durable, and one which can be easily operated to attach or remove the trace.

With these and other objects in view, this invention resides in the novel features of construction, formation, combination and arrangement of parts to be hereinafter more fully described, claimed and illustrated in the accompanying drawing, in which:

Figure 1 is a perspective view of the trace fastener.

Fig. 2 is a longitudinal sectional view through the same.

Fig. 3 is a sectional view on line 3—3 of Fig. 2.

Fig. 4 is a detail perspective view of the plug.

Referring to the drawing 1 indicates the whiffletree, which has fixed thereon the ferrule 2, and is interiorly threaded as at 3, the purpose of which will appear later.

Adapted to engage the threaded portion of the ferrule 2 is an exteriorly threaded plug 4, which is provided with a recess transverse opening 5 intermediate its ends and extending across the entire width of the same. Opening into the opening 5 are bores 6 and 7 for slidably supporting the shank 8, said shank having its outer end provided with a transverse head 9, which serves to prevent disengagement of the trace end when engaged with the shank 8.

The outer end of the opening 5 is provided with coinciding grooves 10 which are engaged by the pin 11 carried by the shank so as to prevent rotation of said shank.

Encircling the shank 8 is a coil spring 12 the outer end of which engages the pin 11, while the inner end thereof engages the inner end of the opening 5, said spring serving to normally urge the shank 8 outwardly.

From this construction it will be seen that by forcing the shank inwardly the pin 11 will disengage one of the grooves 10, thereby permitting the shank to be rotated so that the head 9 will be disposed horizontally, thus permitting the trace to be easily slipped thereover, since the holes in the usual trace are disposed horizontally. After the trace has been engaged with the shank the same is again rotated until the pin 11 engages one of the grooves 10, whereupon the spring 12 will force said shank outwardly so that the pin will yieldably engage the selected groove.

What is claimed is:—

A trace fastener comprising a ferrule having a portion thereof adapted to be mounted on a whiffletree, and its other portion internally threaded, an externally threaded plug mounted in the threaded portion of said ferrule and having its outer end flush with the outer end of said ferrule whereby said plug is mounted entirely within the same, said plug having a longitudinal bore and a transverse opening intersecting said bore intermediate its ends, and extending across the entire width of said plug, one of the end walls of said opening having diametrically disposed grooves therein, a shank slidable longitudinally in said bore and having a head, a pin carried by said shank adjacent the end wall of said opening having the grooves therein adapted to engage in said grooves whereby to prevent turning of said shank, and a spring surrounding said shank and mounted between said pin and opposite end wall of said opening for yieldably holding said pin in engagement with one of the said grooves.

In testimony whereof, I affix my signature, in the presence of two witnesses.

OLIVER A. RUSSELL.

Witnesses:
S. A. McCLINTON,
L. M. HACKETT.

Copies of this patent may be obtained for five cents each, by addressing the "Commissioner of Patents, Washington, D. C."